(12) United States Patent
Lin et al.

(10) Patent No.: US 8,539,048 B2
(45) Date of Patent: Sep. 17, 2013

(54) ELECTRONIC DEVICE AND METHOD FOR LOADING CONFIGURATION FILES USING THE SAME

(75) Inventors: Jun-Jia Lin, Shenzhen (CN); Xue-Wen Hong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 314 days.

(21) Appl. No.: 12/954,616

(22) Filed: Nov. 25, 2010

(65) Prior Publication Data

US 2011/0264903 A1    Oct. 27, 2011

(30) Foreign Application Priority Data

Apr. 27, 2010    (CN) .......................... 2010 1 0157117

(51) Int. Cl.
*G06F 15/177* (2006.01)
(52) U.S. Cl.
USPC ............................................... 709/220; 713/2
(58) Field of Classification Search
USPC ................................ 709/220; 712/220; 713/2
See application file for complete search history.

(56) References Cited

U.S. PATENT DOCUMENTS

| | | | |
|---|---|---|---|
| 6,986,033 B2 * | 1/2006 | Miyamoto et al. | 713/1 |
| 7,975,030 B2 * | 7/2011 | Saeed et al. | 709/220 |
| 8,086,659 B2 * | 12/2011 | Steeb et al. | 709/201 |
| 2003/0070063 A1 * | 4/2003 | Boyle et al. | 713/2 |
| 2003/0097422 A1 * | 5/2003 | Richards et al. | 709/217 |
| 2006/0020414 A1 * | 1/2006 | Jiang | 702/122 |
| 2006/0294257 A1 * | 12/2006 | Kumano et al. | 709/245 |
| 2007/0115967 A1 * | 5/2007 | Vandenberghe et al. | 370/389 |

* cited by examiner

*Primary Examiner* — Thomas Dailey
(74) *Attorney, Agent, or Firm* — Altis Law Group, Inc.

(57) ABSTRACT

A method for loading a configuration file from a remote server to an electronic device includes obtaining a default configuration file from the remote server, and executing the default configuration file to boot the electronic device, identifying a corresponding MAC list in the remote server according to hardware configurations of the electronic device, and obtaining a specific MAC value corresponding to an unused status flag from the MAC list. The method further includes obtaining a default MAC value of a network card of the electronic device, replacing the default MAC value of the network card with the specific MAC value, obtaining a specific configuration file from the remote server according to the specific MAC value, and rebooting the electronic device according to the specific configuration file.

15 Claims, 4 Drawing Sheets

ELECTRONIC DEVICE AND METHOD FOR LOADING CONFIGURATION FILES USING THE SAME

BACKGROUND

1. Field of the Disclosure

Embodiments of the present disclosure relate to file loading, and particularly to an electronic device and a method for loading configuration files from a remote server to the electronic device.

2. Description of Related Art

A configuration file is often loaded from a remote server to a client computer to boot the client computer. However, if the remote server is in communication with a plurality of client computers, with varying hardware configurations, loading a specific configuration file to a designated client computer according to the requisite hardware configuration can present a challenge.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
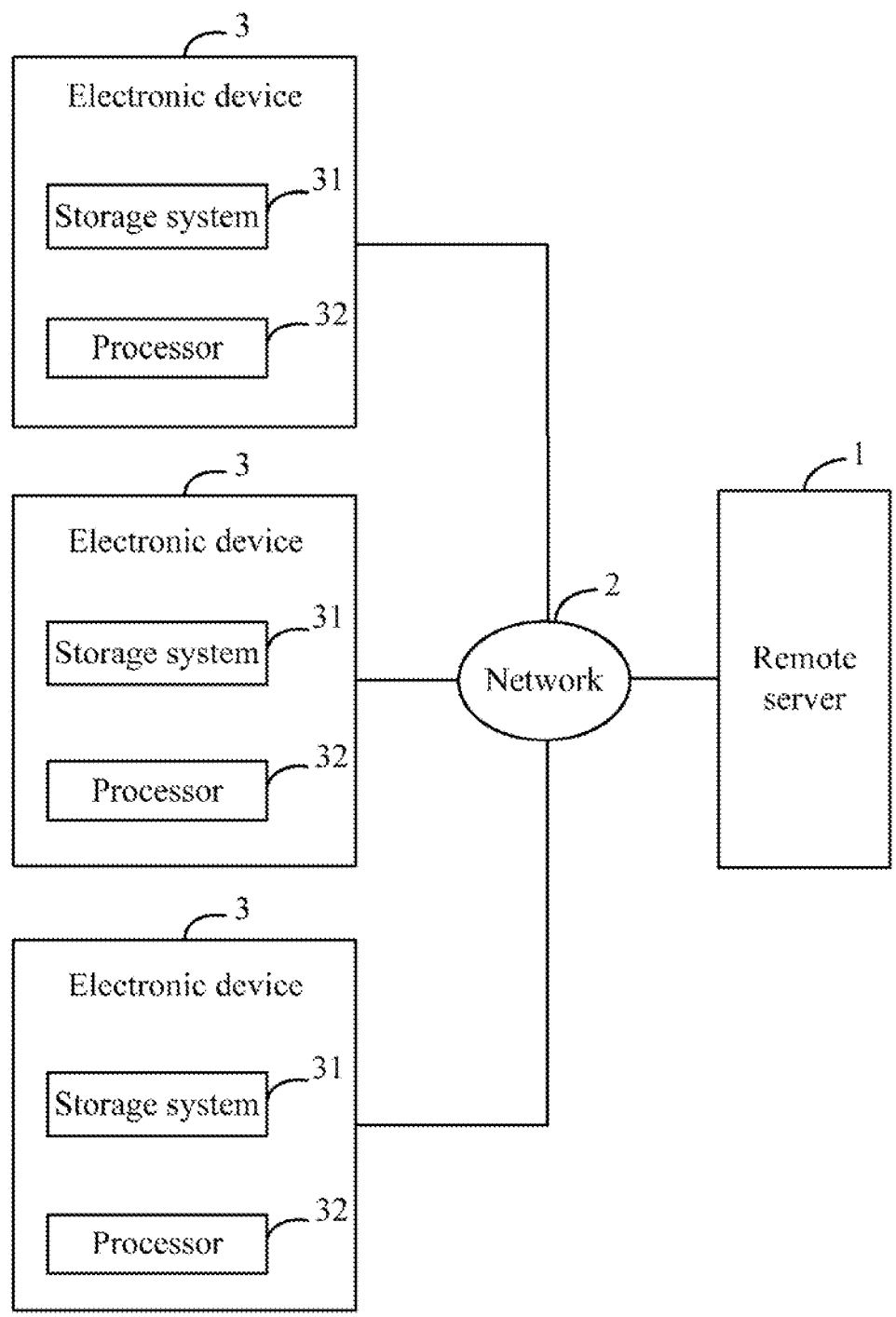
FIG. 1 is a block diagram of one embodiment of a plurality of electronic devices in communication with a remote server via a network.

FIG. 1 is a block diagram of one embodiment of a plurality of electronic devices 3 in communication with a remote server 1 via a network 2. In some embodiments, the electronic devices 3 may be sorted into different categories, with the same hardware configuration. For example, first sorted category of the electronic devices 3 have hardware H1, second sorted category of the electronic devices 3 have hardware H1 and hardware H2, third sorted category of the electronic devices 3 have hardware H1, the hardware H2, and hardware H3. The network 2 may be an intranet, the Internet, or any other type of communications link that follows the Transfer Control Protocol (TCP) and the Internet Protocol (IP). The remote server 1 may include, but is not limited to, a default configuration file of the electronic devices 3, specific configuration files of each of the electronic devices 3, and a plurality of media access control (MAC) lists.

In one embodiment, the default configuration file may be used to boot all electronic devices 3, but may not initialize hardware (e.g., interfaces) of all electronic devices 3. Each of the specific configuration files is suitable for a sorted category of the electronic devices 3 having same hardware configuration. For example, if first sorted category of the electronic devices 3 have hardware H1, second sorted category of the electronic devices 3 have hardware H1 and hardware H2, third sorted category of the electronic devices 3 have hardware H1, hardware H2, and hardware H3. The default configuration file may boot the first sorted category of the electronic devices 3, the second sorted category of the electronic devices 3, and the third sorted category of the electronic devices 3, but cannot initialize hardware H1, H2 and H3. A first specific configuration file of the specific configuration files may boot the first sorted category of the electronic devices 3 and initialize the hardware H1, a second specific configuration file of the specific configuration files may boot the second sorted category of the electronic devices 3 and initialize the hardware H1 and H2, and a third specific configuration file of the specific configuration files may boot the third sorted category of the electronic devices 3 and initialize the hardware H1, H2, and H3.

Figure 4:
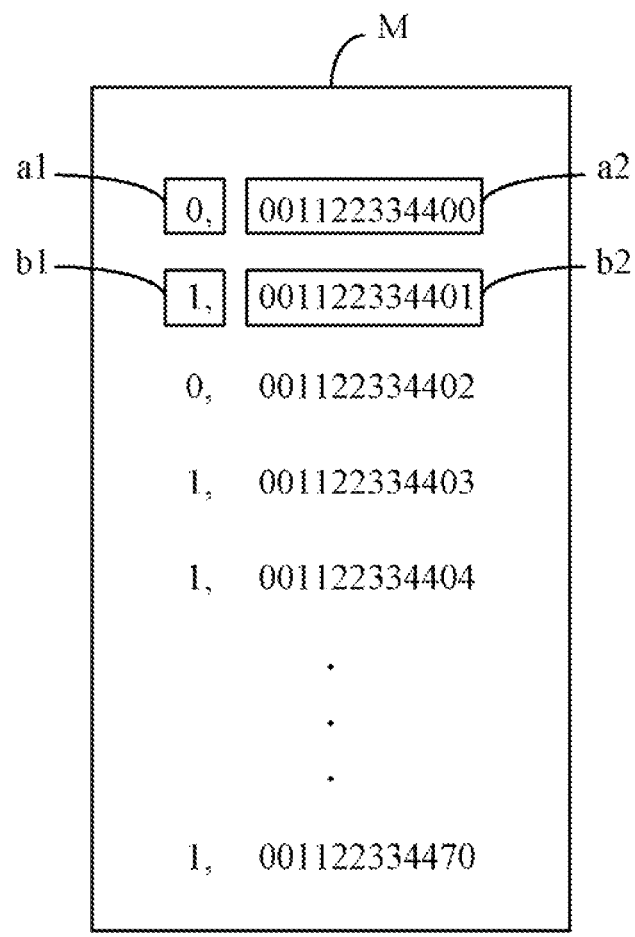
FIG. 4 is a schematic diagram illustrating a MAC list in the remote server.

In one embodiment, each of the MAC lists stores one or more MAC records of a sorted category of the electronic devices 3. Each of the MAC records includes a status flag and a MAC value. The status flag includes a used status flag and an unused status flag. The used status flag indicates that a MAC value of the MAC record is under used status, the unused status flag indicates that the MAC value of the MAC record is under unused status. As shown in FIG. 4, M is a MAC list, a1 is a status flag of a first MAC record, a2 is MAC value of the first MAC record, b1 is a status flag of a second MAC record, b2 is MAC value of the second MAC record.

Each of the electronic devices 3 includes a storage device 31, and a processor 32. In one embodiment, the electronic device 3 may load a corresponding specific configuration file according to the hardware configurations of each of the electronic devices 3 from the remote server 1. The storage system 31 may store various kinds of data, such as a temporary file stores default MAC value of a network card of electronic device 3. For example, the storage system 31 may be a smart media card, a secure digital card, a compact flash card, a multi-media card, a memory stick, or an extreme digital card. The processor 32 executes one or more computerized operations stored in the storage system 31 and other applications, to provide functions of the electronic devices 3.

Figure 2:
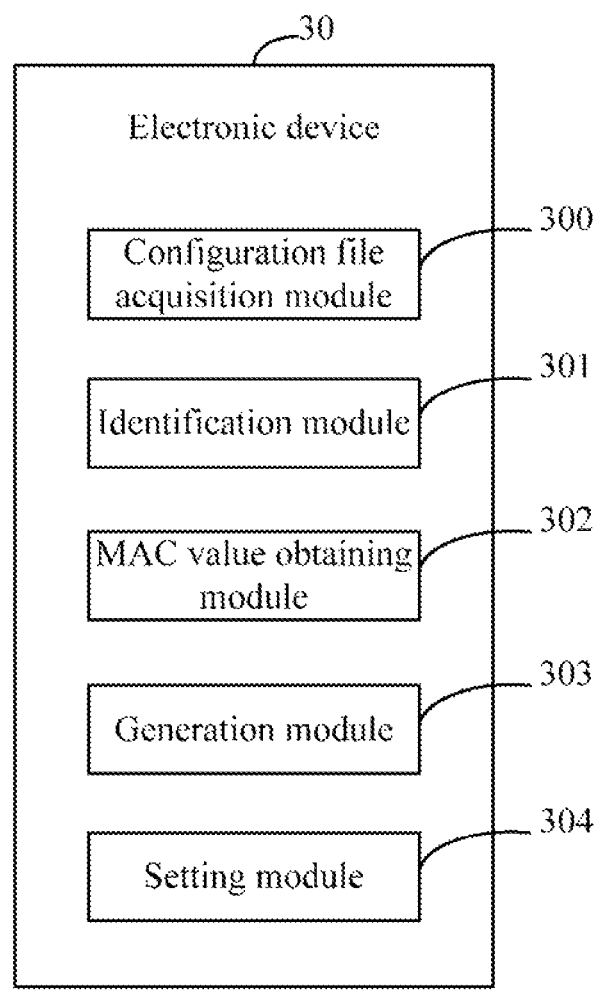
FIG. 2 is a block diagram of one embodiment of the electronic device of FIG. 1.

FIG. 2 is a block diagram of one embodiment of the electronic device 3 of FIG. 1. In some embodiments, the electronic device 3 includes an configuration file acquisition module 300, an identification module 301, a MAC value obtaining module 302, a generation module 303, and a setting module 304. The modules 300, 301, 302, 303, and 304 may comprise computerized code in the form of one or more programs that are stored in the storage system 31 (or memory). The computerized code includes instructions that are executed by the at least one processor 32 to provide functions for modules 300, 301, 302, 303, and 304.

The configuration file acquisition module 300 obtains the default configuration file from the remote server 1, and executes the default configuration file to boot the electronic device 3. The default configuration file may include information for the operating system to boot the electronic device 3.

The identification module 301 obtains hardware configurations of the electronic device 3, and identifies a corresponding MAC list in the remote server 1 according to the obtain hardware configurations.

The MAC value obtaining module 302 obtains a specific MAC value corresponding to an unused status flag from the MAC list, updates the unused status flag of the specific MAC value to a used status flag, and obtains a default MAC value of the network card from the electronic device 3. For example, if "0" is the unused status flag and "1" is the used status flag, as shown in FIG. 4, the MAC value obtaining module 302 may obtain a MAC value "001122334400" corresponding to a unused status flag "0," and update the unused status flag "0" to a used status flag "1."

The generation module 303 generates a temporary file to store the default MAC value.

The setting module 304 replaces the default MAC value of the network card of the electronic device 3 with the specific MAC value.

The configuration file acquisition module 300 further obtains a specific configuration file from the remote server 1 according to the specific MAC value, reboots the electronic device 3 according to the specific configuration file. In one embodiment, if the specific MAC value is "001122334400," the configuration file acquisition module 300 may add "01" before a first number of the specific MAC value "001122334400" to get a new specific MAC value "01001122334400," and add "-" between each two numbers of the new specific MAC value. Thus, the name of the specific configuration file is "01-00-11-22-33-44-00." The specific configuration file may not only include operating system to boot the electronic device 3, but also include initialize routine of hardware of the electronic device 3.

If the electronic device 3 is shut down, the setting module 304 further updates the specific MAC value of the network card to the default MAC value of the temporary file, deletes the temporary file, and updates the used status flag of the specific MAC value in the MAC value list to the unused status flag.

Figure 3:
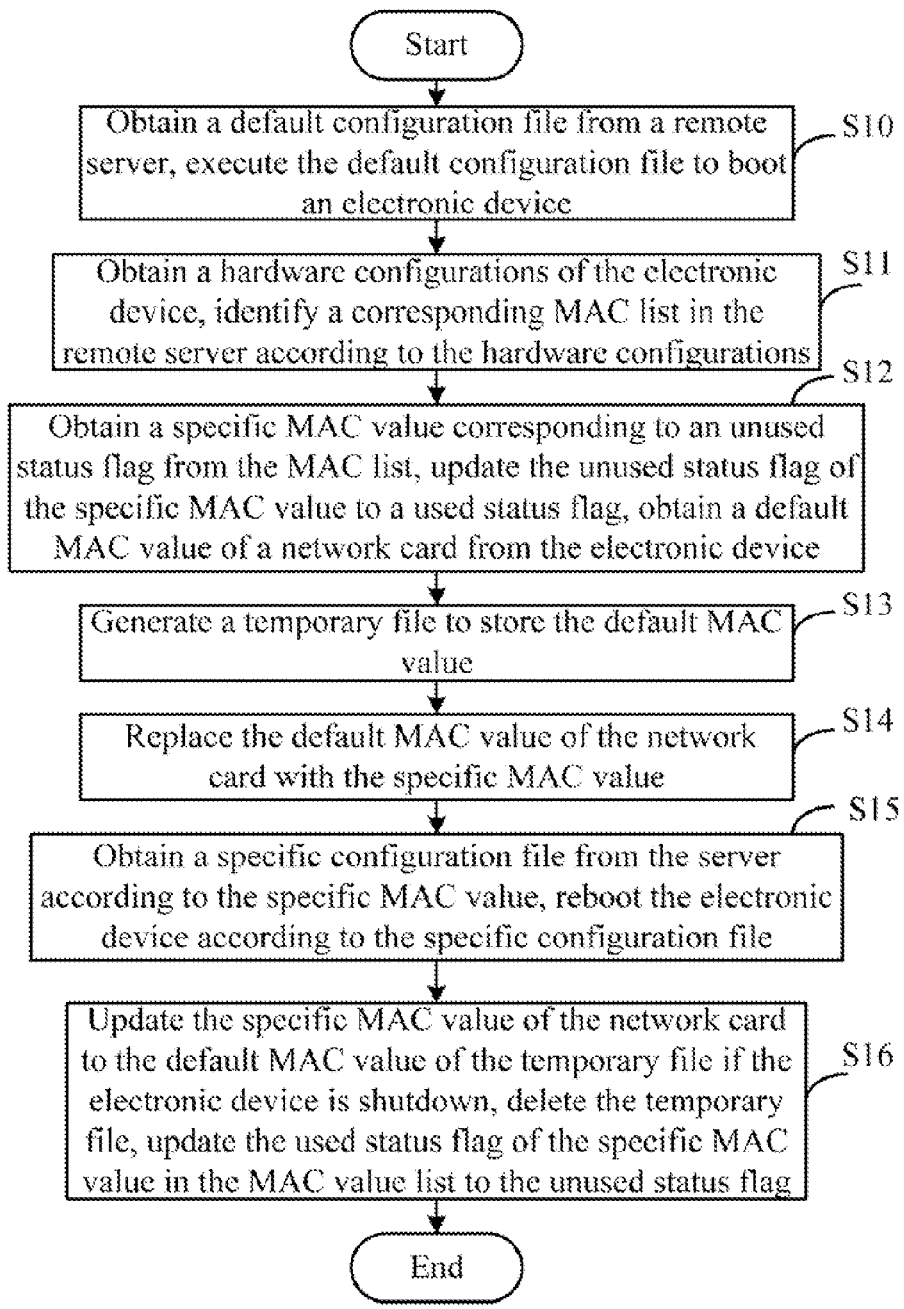
FIG. 3 is a flowchart of one embodiment of a method for loading configuration files from a remote server using the electronic device of FIG. 1.

FIG. 3 is a flowchart of one embodiment of a method for loading configuration files from a remote server 1.

In block S10, the configuration file acquisition module 300 obtains a default configuration file from the remote server 1, and executes the default configuration file to boot the electronic device 3.

In block S11, the identification module 301 obtains hardware configurations from the electronic device 3, identifies a corresponding MAC list in the remote server 1 according to the obtain hardware configurations.

In block S12, the MAC value obtaining module 302 obtains a specific MAC value corresponding to an unused status flag from the MAC list, updates the unused status flag of the specific MAC value to a used status flag, and obtains a default MAC value of the network card from the electronic device 3.

In block S13, the generation module 303 generates a temporary file to store the default MAC value.

In block S14, the setting module 304 replaces the default MAC value of the network card of the electronic device 3 with the specific MAC value.

In block S15, the configuration file acquisition module 300 further obtains a specific configuration file from the remote server 1 according to the specific MAC value, and reboots the electronic device 3 according to the specific configuration file.

If the electronic device 3 is shut down, in block S16, the setting module 304 further updates the specific MAC value of the network card to the default MAC value of the temporary file deletes the temporary file, and updates the used status flag of the specific MAC value in the MAC value list to the unused status flag.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device in communication with a remote sever, the electronic device comprising:
   a storage system;
   at least one processor; and
   one or more programs stored in the storage system and being executable by the at least one processor, the one or more programs comprising:
   a configuration file acquisition module operable to obtain a default configuration file from the remote server, and execute the default configuration file to boot the electronic device;
   an identification module operable to obtain hardware configurations of the electronic device, and identify a corresponding media access control (MAC) list in the remote server according to the obtain hardware configurations;
   a MAC value obtaining module operable to obtain a specific MAC value corresponding to an unused status flag from the MAC list, update the unused status flag of the specific MAC value to a used status flag, and obtain a default MAC value of a network card of the electronic device;
   a setting module operable to replace the default MAC value of the network card with the specific MAC value;
   the configuration file acquisition module further operable to obtain a specific configuration file from the remote server according to the specific MAC value, and reboot the electronic device according to the specific configuration file.

2. The electronic device of claim 1, further comprising:
   a generation module operable to generate a temporary file to store the default MAC value.

3. The electronic device of claim 2, wherein the setting module is further operable to update the specific MAC value of the network card to the default MAC value of the temporary file if the electronic device is shutdown, delete the temporary file, and update the used status flag of the specific MAC value in the MAC value list to the unused status flag.

4. The electronic device of claim 1, wherein the MAC list comprises one or more MAC records of electronic devices having same hardware configurations, each of the MAC records comprises a status flag and a MAC value.

5. The electronic device of claim 4, wherein the status flag is "0" or "1".

6. A method for loading a configuration file from a remote server to an electronic device, the method comprising:
   obtaining a default configuration file from the remote server, and executing the default configuration file to boot the electronic device;
   obtaining hardware configurations of the electronic device, and identifying a corresponding media access control (MAC) list in the remote server according to the obtained hardware configurations;
   obtaining a specific MAC value corresponding to an unused status flag from the MAC list, and updating the unused status flag of the specific MAC value to a used status flag;
   obtaining a default MAC value of a network card of the electronic device;
   replacing the default MAC value of the network card with the specific MAC value;
   obtaining a specific configuration file from the remote server according to the specific MAC value, and rebooting the electronic device according to the specific configuration file.

7. The method of claim 6, further comprising:
generating a temporary file to store the default MAC value.

8. The method of claim 7, further comprising:
updating the specific MAC value of the network card to the default MAC value of the temporary file if the electronic device is shutdown;
deleting the temporary file;
updating the used status flag of the specific MAC value in the MAC value list to the unused status flag.

9. The method of claim 6, wherein the MAC list comprises one or more MAC records of electronic devices having same hardware configurations, each of the MAC records comprises a status flag and a MAC value.

10. The method of claim 9, wherein the status flag is "0" or "1".

11. A non-transitory storage medium having stored thereon instructions that, when executed by a processor, cause the processor to perform a method for loading a configuration file from a remote server to an electronic device, the method comprising:
obtaining a default configuration file from the remote server, and executing the default configuration file to boot the electronic device;
obtaining hardware configurations of the electronic device, and identifying a corresponding media access control (MAC) list in the remote server according to the obtained hardware configurations;
obtaining a specific MAC value corresponding to an unused status flag from the MAC list, and updating the unused status flag of the specific MAC value to a used status flag;
obtaining a default MAC value of a network card of the electronic device;
replacing the default MAC value of the network card with the specific MAC value;
obtaining a specific configuration file from the remote server according to the specific MAC value, and rebooting the electronic device according to the specific configuration file.

12. The non-transitory storage medium of claim 11, further comprising:
generating a temporary file to store the default MAC value.

13. The non-transitory storage medium of claim 12, further comprising:
updating the specific MAC value of the network card to the default MAC value of the temporary file if the electronic device is shutdown;
deleting the temporary file;
updating the used status flag of the specific MAC value in the MAC value list to the unused status flag.

14. The non-transitory storage medium of claim 11, wherein the MAC list comprises one or more MAC records of electronic devices having same hardware configurations, each of the MAC records comprises a status flag and a MAC value.

15. The non-transitory storage medium of claim 14, wherein the status flag is "0" or "1".

* * * * *